United States Patent
Gloeckler

[11] 3,779,004
[45] Dec. 18, 1973

[54] FUSIBLE LINK
[75] Inventor: Fred A. Gloeckler, Huntington Valley, Pa.
[73] Assignee: Star Sprinkler Corporation of Florida, Philadelphia, Pa.
[22] Filed: Sept. 12, 1972
[21] Appl. No.: 288,280

[52] U.S. Cl................... 59/93, 16/48.5, 24/201 LP, 49/8
[51] Int. Cl............................................. F16g 15/00
[58] Field of Search ...................... 59/93, 86, 85, 78; 24/201 LP, 201 D, 116 R, 115 F, 31 L; 49/8, 7, 4, 1; 16/48.5

[56] References Cited
UNITED STATES PATENTS
1,826,553  10/1931  Lasier ................................ 16/48.5
2,904,866  9/1959  Carter ............................. 24/201 D
3,089,568  5/1963  Thompson ......................... 16/48.5
3,597,809  8/1971  Crane ................................. 49/8
3,725,972  4/1973  McCabe ............................ 16/48.5

Primary Examiner—Charles W. Lanham
Assistant Examiner—Gene P. Crosby
Attorney—Zachary T. Wobensmith, II

[57] ABSTRACT

A fusible link is provided suitable for use for controlling a weight release, for a door closer or for a sprinkler, which can be used in tension or compression, and which includes two link elements one interengaged with the other and held against movement by a transverse fusible temperature responsive retainer.

7 Claims, 5 Drawing Figures

PATENTED DEC 18 1973 3,779,004
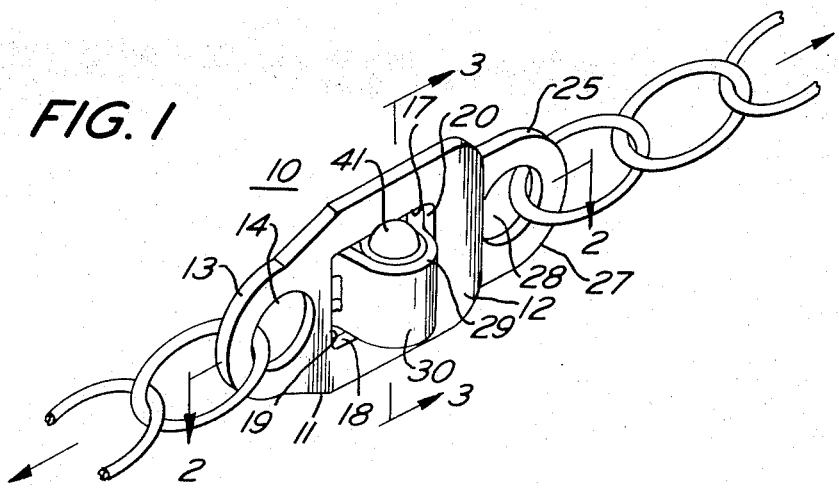
FIG. 1
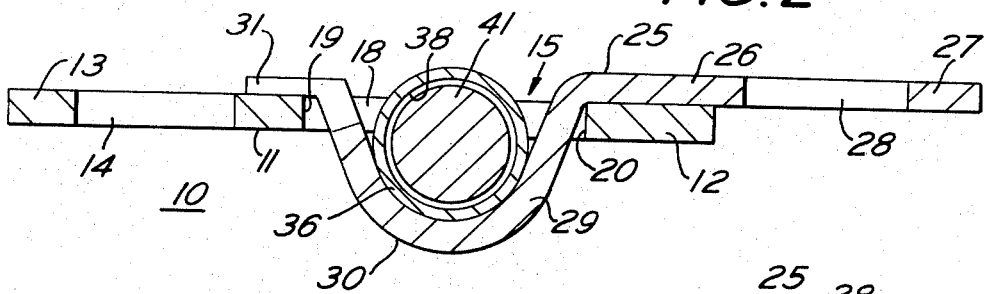
FIG. 2
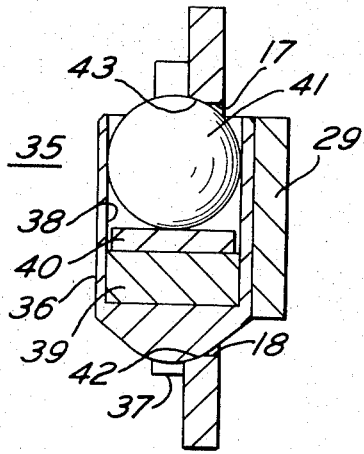
FIG. 3
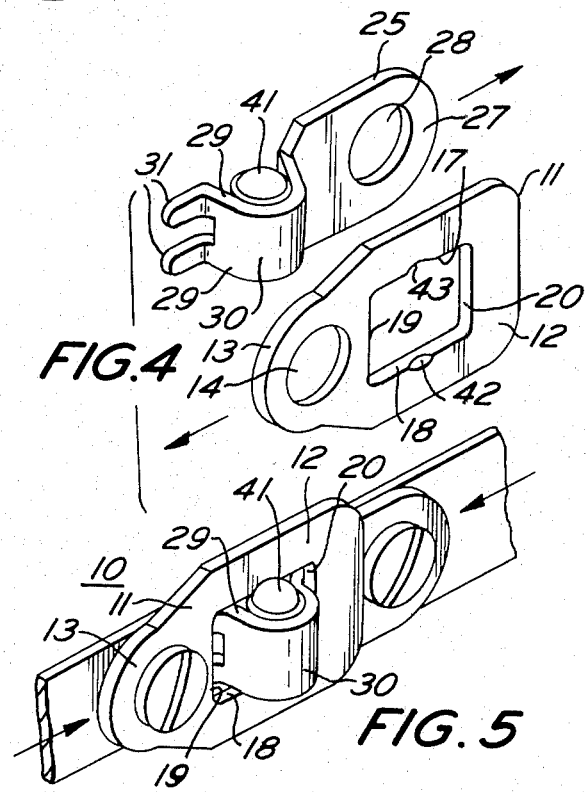
FIG. 4
FIG. 5

3,779,004

FUSIBLE LINK

BACKGROUND OF THE INVENTION

1. Field of the Invention

This invention relates to fusible links and move particularly to a link having interengaging components which are released when ambient temperature reaches a predetermined level.

2. Description of the Prior Art

Various types of fusible links have heretofore been proposed.

In some of these the eutectic alloy which controls the release is directly subjected to tension or compression. With the passage of time and without being subjected to the elevated temperature at which release is to occur, those links fail by reason of a creep action which is a characteristic of the eutectic alloy.

In other fusible links, because of their construction, rating was limited to 360° F. for a loading in the range from 3 to 40 pounds.

The link of the present invention is suitable for a higher range of temperature to include 500° F. and a wider load range of the order of 1 to 50 pounds.

SUMMARY OF THE INVENTION

In accordance with the invention, a fusible link is provided comprising interengaging link portions, one of the link portions having an aperture through which an integral loop or staple of the other link portion extends, a transversely disposed temperature responsive strut member with a fusible insert being positioned in and engaging the loop or staple and opposite margins of the aperture and disengaged upon being subjected to a predetermined temperature.

It is the principal object of the invention to provide a fusible link which is simple in construction, reliable in operation, free from operating difficulties and likelihood of failure prior to release by exposure to a predetermined temperature.

It is a further object of the invention to provide a fusible link which has a wider available operating range than fusible links heretofore available.

It is a further object of the invention to provide a fusible link of the character aforesaid which will be relatively inexpensive to manufacture.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which:

FIG. 1 is a perspective view of the link and under tension;

FIG. 2 is a longitudinal sectional view on the line 2—2 of FIG. 1;

FIG. 3 is a transverse sectional view on the line 3—3 of FIG. 1;

FIG. 4 is an exploded perspective view; and

FIG. 5 is a view similar to FIG. 1 with the link under compression.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the fusible link 10 comprises a first link portion 11, preferably made as a sheet metal stamping, with a generally rectangular body 12 and an end 13 with an opening 14 for attachment at the place of use.

The body 12 has a central opening 15 of generally rectangular shape with opposite parallel side margins 17 and 18 and opposite parallel end margins 19 and 20.

A second link portion 25 is provided, preferably also made as a sheet metal stamping, with a generally rectangular body 26 and an end 27 with an opening 28 for attachment at the place of use.

The body 26 has an integral loop or staple 29 of rounded V-shaped extending out of the main plane of body 26, which is narrower than the distance between the side margins 17 and 18 and is disposed through the central opening 15 of the first link portion 11, between the side margins 17 and 18 and in engagement with the end margins 19 and 20. The outer face 30 has a camming action with one of the margins 19 or 20 as hereinafter pointed out.

The second link portion 25, with the loop or staple 29 through the opening 15 has the contiguous portion of its body 26 in flat or face to face relation to the body 12 of the first loop portion.

The loop or staple 29 has a pair of integral spaced fingers 31 in the same plane as the body 26 which extend through the opening 15 past the end margin 19 and in contact with the same face of the body 12 with which the body 26 is in flat engagement.

A temperature responsive strut 35 is provided to hold the link portions 11 and 20 in assembled relation for use.

The strut 35 has a strut body 36 with a rounded end 37 and a hollow interior or cavity 38. Within the cavity 38 a pellet 39 of eutectic fusible alloy of well known type is provided and which may have melting temperatures of 135°, 165°, 212°, 286°, 360°, 400°, or 500° F., or other melting temperature as desired.

A disc 40 retains the pellet 39 in cavity 38 and distributes the load from a ball 41 which bears against the disc 40.

The ball 41 is seated in a recess 42 in the body along the margin 18. The end 37 is seated in a recess 43 along the margin 17.

The mode of operation will now be pointed out.

With the fusible link 10 in assembled condition the link 10 can be employed for various purposes, in tension or compression as required, including the control of weight release, to control the closing of a fire door, or as the fusible link in a link and lever type sprinkler. The end openings 14 and 28 are available for attachment into the apparatus to be controlled.

When the temperature in the vicinity of the link 10 is reached which is the melting temperature of the pellet 39, the pellet 39 melts so that the ball 41 which is no longer held by the pellet 39 and disc 40, moves inwardly within the cavity 38. The pressure applied by the relatively snug fit of the strut 35 within the staple 29 and the engagement of the ball 41 and rounded end 37 in the recesses 42 and 43 aids in the longitudinal collapse of the strut 35.

The force applied on the link portions 11 and 25 is effective for separating the link portions 11 and 25 since they are no longer retained by the strut 35.

If the link portions 11 and 25 are in tension the outer face 30 of the staple 29 has a camming action against the end margin 20 to aid in the shortening of link 10 and separation of the link portions 11 and 25.

If the link portions 11 and 25 are in compression the outer face of the staple 29 has a camming action against the end margin 19 to aid in the shortening of the link 10 and separation of link portions 11 and 25.

I claim:

1. A fusible link comprising
 a first link portion having an opening therethrough,
 a second link portion having an integral staple extending therethrough, and
 a transverse strut disposed within said staple and in engagement therewith and with said first link portion,
 said transverse strut having therein a portion of eutectic alloy with a predetermined melting temperature normally holding said strut in place but being collapsible upon melting of said eutectic alloy.

2. A fusible link as defined in claim 1 in which said first link portion has a flat body in which said opening is located,
 said second link portion has a flat body from which said staple extends.

3. A fusible link as defined in claim 2 in which said body of said second link portion is disposed in face to face relation to the body of said first link portion on one side face thereof.

4. A fusible link as defined in claim 3 in which said staple has an extension in engagement with said side face of said first link portion.

5. A fusible link as defined in claim 1 in which said strut has ends in engagement with said first link portion at opposite sides of said opening.

6. A fusible link as defined in claim 1 in which said opening has end margins, and
 said staple has an outer face portion for camming engagement with one of said end margins upon release of said strut by melting of said eutectic alloy.

7. A fusible link as defined in claim 1 in which said staple is of lesser width than said opening, and
 said strut is of greater width than said opening and is normally engaged with said first link portion at the side margins of said opening.

* * * * *